United States Patent [19]
Weir et al.

[11] Patent Number: 5,960,550
[45] Date of Patent: Oct. 5, 1999

[54] DEVICE AND METHOD FOR MARKING OPHTHALMIC LENSES AND MOLDS

[75] Inventors: Robert P. Weir, Sonoma; Thomas J. Hawkins, San Rafael, both of Calif.

[73] Assignee: Sola International, Inc., Menlo Park, Calif.

[21] Appl. No.: 08/903,721

[22] Filed: Jul. 31, 1997

[51] Int. Cl.⁶ ............................... B43L 9/00; B43L 11/00
[52] U.S. Cl. ..................... 33/28; 33/200; 33/507
[58] Field of Search ................. 33/28, 200, 507

[56] References Cited

U.S. PATENT DOCUMENTS

| | | | |
|---|---|---|---|
| 2,930,130 | 3/1960 | Ray et al. | 33/28 |
| 3,459,085 | 8/1969 | Takubo | 83/410 |
| 4,062,629 | 12/1977 | Winthrop | 351/169 |
| 4,115,924 | 9/1978 | Kleinkopf | 33/507 |
| 4,676,004 | 6/1987 | Nakamura et al. | 33/507 |
| 4,676,610 | 6/1987 | Barkan et al. | 351/169 |
| 4,806,010 | 2/1989 | Ewer et al. | 351/169 |
| 4,838,675 | 6/1989 | Barkan et al. | 351/469 |
| 4,977,675 | 12/1990 | Jewett, Sr. | 33/28 |
| 5,178,800 | 1/1993 | Blum | 264/1.38 |
| 5,754,272 | 5/1998 | Dimalanta | 351/204 |
| 5,806,198 | 9/1998 | Guillermin | 33/502 |

OTHER PUBLICATIONS

Troy E. Fannin, et al., "Clinical Optics" *Butterworth–Heinemann (2d Ed.)*, pp. 249–263 (1996).

"Progressive Identifier" *Publications Division of the Optical Laboratories Association and the OLA Laboratory*, pp. 1–8 (1995).

"Sola XL/VIP Laboratory Processing Guide" *Sola Optical USA, Inc.*, pp. 1–53 (Jul. 1990).

*Primary Examiner*—Diego Gutierrez
*Assistant Examiner*—Richard A. Smith
*Attorney, Agent, or Firm*—Burns Doane Swecker Mathis L.L.P.

[57] ABSTRACT

Device and method for accurately recreating verification markings with removable ink on progressive ophthalmic lenses and molds are provided. The device includes (a) a stage which defines a coordinate system and which is adapted for receiving a lens or mold; (b) a magnifying device for locating the reference marks on the lens or mold surface; (c) a computer for storing coordinates from the platform wherein the coordinates represent the locations of two reference marks on the lens or mold surface; and (d) a pen device adapted to be positioned over the surface of the lens or mold wherein the pen device is controlled by the computer for applying the verification markings on the lens or mold surface.

23 Claims, 1 Drawing Sheet

Microfiche Appendix Included
(1 Microfiche, 27 Pages)

DEVICE AND METHOD FOR MARKING OPHTHALMIC LENSES AND MOLDS

MICROFICHE APPENDIX

This document includes a microfiche appendix which contains one (1) microfiche having a total of 27 frames.

FIELD OF THE INVENTION

This invention is related to ophthalmic lenses and, in particular, to progressive power ophthalmic lenses in which a surface of the lens has distance, near and intermediate viewing zones with boundaries and contours which provide desired optical properties over the surface of the lens. The invention further relates to molds employed to fabricate progressive power ophthalmic lenses.

BACKGROUND

Methods of making progressive lens surfaces are known in the art and are described, for example, in U.S. Pat. Nos. 4,676,610, 4,806,010 and 4,838,675. Finished progressive lenses are typically made from progressive lens blanks, i.e., optical bodies having a finished convex front progressive surface and an unfinished rear concave surface. The rear surface is normally finished to produce a lens which meets the wearer's prescription. The fitting of progressive lenses is more demanding than the fitting of conventional multifocals. In this regard, each progressive lens blank typically has two sets of markings, a temporary set and a permanent set, to assist in verification of power and in fitting the lenses to the patient's face. The temporary markings (or verification markings) usually consist of a fitting cross, which should fall within 2 to 3 mm from the center of the pupil, and a distance reference center mark and a near-reference center mark to use in checking the powers of the distance and near segment areas. Preferably, the temporary markings should be left on the lens until the position of the fitting cross can be verified on the patient's face.

The permanent markings are typically semi-visible, and consist of two mesas (or slight elevations) on the surface of a lens that establish the horizontal line at the optical center of the lens. Some manufacturers also place their own identification mark and the power of the add near the semi-visible marks on the temporal side of the lens.

In the event that the temporary markings are removed, they can be reconstructed by locating, marking, and placing the semi-visible marks over the manufacturer's centration chart, and then tracing the verification marks with a pen. If the lens is placed against a dark background and viewed with an intense light, the semi-visible marks can be seen more easily. Conventional methods of recreating the verification marks can be cumbersome and imprecise.

SUMMARY OF THE INVENTION

The present invention is based in part on the discovery that verification markings can be accurately reproduced on progressive ophthalmic lens with a computer aided device.

In one aspect, the invention is directed to a method of applying verification markings on an ophthalmic lens which includes the steps of:

providing a stage which is movable in a plane wherein positions of the stage are identifiable in a coordinate system;

attaching the lens on the stage;

locating two reference marks on the surface of the lens;

identifying the positions of the two reference marks by coordinates;

utilizing the coordinates of the two reference marks in a computer which includes a database containing the coordinates of verification markings for the lens;

positioning the lens under a pen, preferably by moving the stage;

calibrating the position of the pen; and applying the verification markings on the lens surface with movement of the stage and/or the pen wherein the movement of the stage and/or pen is controlled by the computer.

In another aspect, the invention is directed to a device for applying verification markings on an ophthalmic lens which includes:

a stage which defines a coordinate system and which is adapted for receiving the ophthalmic lens;

a magnifying device for locating reference marks on the ophthalmic lens surface;

a computer having a database containing the coordinates of verification markings for the ophthalmic lens; and a pen device adapted to be positioned over the surface of the ophthalmic lens wherein movement of the stage and/or pen device and stage are controlled by the computer for applying the verification markings on the ophthalmic lens surface.

The inventive method and device are also applicable for applying verification markings on molds which are employed to cast progressive lenses. A feature of the invention is that the verification markings are reproduced using removable ink. In one embodiment, the computer database contains numerous patterns of verification markings that correspond to different ophthalmic lens designs. In this case, the technician employing the inventive device selects the desired pattern for production on the ophthalmic lens surface.

In manufacturing ophthalmic lenses, the verification marks are originally printed onto the lens surface by transfer-pad printing. The present invention provides a convenient method of reinking the lens should one or more of these marks be removed prematurely.

DETAILED DESCRIPTION OF THE INVENTION

Figure 1:
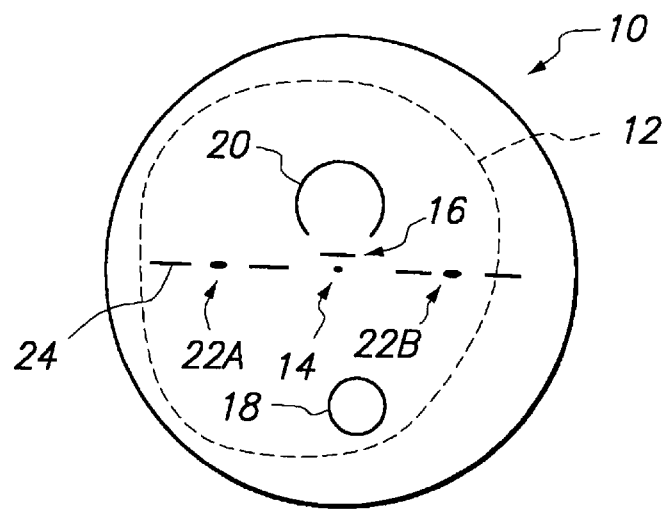
FIG. 1 is a plan view of an ophthalmic lens blank with verification marks thereon.

FIG. 1 illustrates a progressive power ophthalmic lens blank 10 that has semi-visible marks 22A and 22B and has printed verification reference markings on its surface. As used herein, the term "reference mark" or "semi-visible mark" shall refer to any substantially permanent mark on the progressive ophthalmic lens surface. Typically, two reference marks are present and the locations of the verification marks can be readily determined once the reference marks are located. The semi-visible marks typically comprise mesa-like structures on the lens surface which are created during the manufacturing of the lens. It is understood that the semi-visible marks can comprise any physical deformation that is created on the otherwise smooth surface of the lens. Progressive ophthalmic lenses are described, for example, in U.S. Pat. Nos. 4,676,610, 4,806,010 and 4,838,675 which are incorporated herein.

The verification markings include the major reference point 14 which is the geometric center of the lens, the axis line 24 which passes through the reference point and the semi-visible marks, lens fitting cross 16, distance power measuring circle (or distance horseshoe) 20, and the add power measuring circle (or near circle) 18. The distance horseshoe is for verifying the patient's distance prescription and the near circle is for verifying the add power. Since progressive lenses do not have discernable bifocal segments or demarcations, the verification markings help identify the precise positions of the near vision portion of the lens, for instance. The other verification marks are employed to guide the technician in properly edging the lens blank so that the contour of the finished lens as shown in silhouette 12 aligns the lens features properly within the frame of the eyeglass. Further, each properly finished progressive ophthalmic lens will have distance, near and intermediate viewing zones correctly aligned with the patient's eye. For example, when the finished eyeglass is worn the fitting cross is typically in front of the patient's pupil. As is apparent, the ophthalmic lens blanks are circular, however, it is understood that the present invention is applicable to blanks of any geometry.

Generally, each manufacturer standardizes the patterns and positions of the various verification marks that it employs. Indeed, industry wide standards also exist in that the distance between the center of the two semi-visible marks is 34 mm and each is 17 mm from the geometric center. Commercially available publications provide the specific verification markings used by different manufacturers of progressive lenses. Thus, once the locations of the two semi-visible marks are known, the positions of the verification marks can be readily determined for any particular lens.

Suitable ophthalmic lenses are fabricated from materials having superior structural and optical properties. Crystalline quartz, fused silica, soda-lime silicate glass, and plastics such as from polymers based on allyl diglycol carbonate monomers (available as CR-391™ from PPG Industries, Inc., Hartford, Conn.), diacrylate or dimethacrylate compounds as described in U.S. Pat. Nos. 5,373,033 and 4,912,185, both incorporated herein, and which are available as SPECTRALITE™ from Sola Optical USA, Inc. Petaluma, Calif., and polycarbonates such as LEXAN™, available from General Electric Co., are preferred substrate materials for ophthalmic lenses (including sunglasses).

Preferred ophthalmic lenses also include laminated lenses that are fabricated by bonding two lens wafers (i.e., a front wafer and a back wafer) together with a transparent adhesive. Laminated lens wafers are described, for example, in U.S. Pat. Nos. 5,149,181, 4,857,553, and 4,645,317 and U.K. Patent Application, GB 2,260,937A, all of which are incorporated herein. Suitable substrates farther include glass ophthalmic lenses, as described, for instance, in U.S. Pat. Nos. 3,899,315 and 3,899,314, both of which are incorporated herein. As used herein, the term "ophthalmic lens" or "lens" refers to both single integral body and laminated types and to circular shaped blanks or lens of any geometry.

Progressive ophthalmic lenses are typically prepared by casting in a mold. The mold has a shaping surface of the curvature or configuration desired on one side of the finished lens. In addition, the mold has two depressions which correspond to the locations of the reference marks on the progressive ophthalmic lens to be fabricated. The present invention can also be employed to verify that a particular mold is suitable for fabricating the desired progressive ophthalmic lens. This is done by applying verification markings on the mold surface in the same manner as for the ophthalmic lenses and thereafter measuring the mold at these points.

The progressive ophthalmic lens can be uncoated or coated for abrasion resistance and/or antireflectivity. Ophthalmic lenses, particularly plastic ones, are coated with a polymeric abrasion or scratch resistance coating that may be about 1 $\mu$m to about 12 $\mu$m thick. The thickness of the polymeric scratch resistance coating will depend, in part, on the substrate material. Generally, plastic materials such as polycarbonates will require thicker coatings. Ophthalmic lenses may also have an antireflection coating which refers to a substantially transparent multilayer film that is applied to optical systems (e.g., surfaces thereof) to substantially eliminate reflection over a relatively wide portion of the visible spectrum and reduce surface reflectance.

The present invention is particularly suited for lenses that have antireflection and/or abrasion resistant coatings and for lenses that are tinted. The reason is that before the coating or tinting process, the initial temporary verification markings on the lenses must be removed. The present invention restores these markings.

Figure 2:
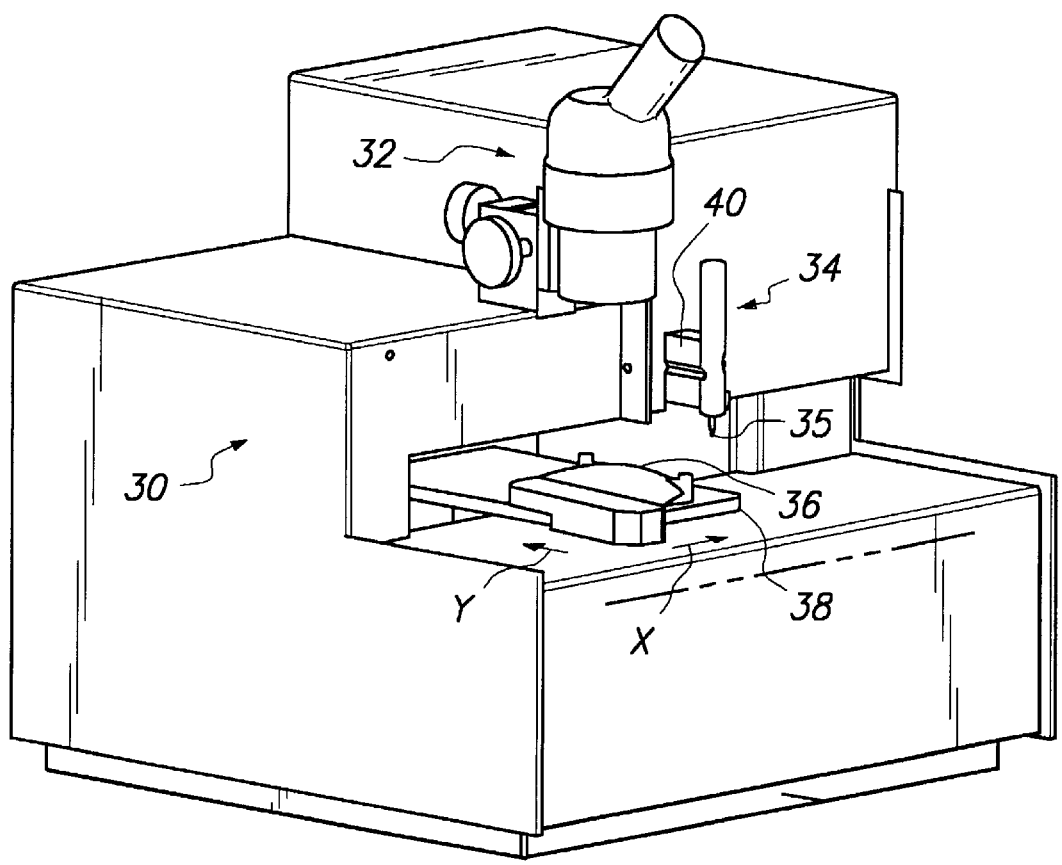
FIG. 2 is a drawing illustrating a device for restoring verification markings on ophthalmic lens blanks.

FIG. 2 illustrates a reinker device 30 for restoring verification markings on ophthalmic lenses. The device includes a stage or table 38 which can move on the plane defined by a suitable coordinate system, e.g., x-y coordinates. In this fashion, the positions on the table are correlated to the coordinate system so that when an ophthalmic lens is placed on the stage the location of any point on the lens surface can be identified.

The device includes a magnifying device 32 which can locate the two semi-visible marks on the lens surface. A preferred device is a microscope that preferably has a wire, thread or similar marking in the focus of the eyepiece that functions as a reference line in the field so that the positions of the semi-visible marks can be readily and consistently identified. Preferably, the microscope has a cross hair reticle in the focus of the eyepiece. The microscope is preferably a conventional monocular unit preferably having 20× magnification, a roof prism erector, and a field of view of ⅜ in. (9.5 mm). The 10× eyepiece is preferably replaced with a 10× focusing eyepiece which is designed to receive and focus on a cross hair reticle. The reticle is preferably positioned to coincide with the 2 axes in order to appear aligned. A conventional candelabra base lamp is employed to illuminate the lens.

The device further includes a movable pen device 34 having tip 35 for creating markings on lenses. The removable pen device is attached to arm 40. The pen, which preferably has a fine point, is supported or attached to material which has a spring property that will retain the pen during the reinking process yet allows the pen to be removed for recapping, storage and replacement. Arm 40 is fastened to an "L" shaped member which is fastened to a small ball bearing slide. This slide provides precise linear motion in the z-axis. The "L" shaped member can be raised by a thin rod or other conventional means.

The reinker device 30 also includes computer which has a database wherein data regarding generic markings or markings for a specific lens type and manufacturer are stored. The particular verifications markings to be generated can be selected by identifying the particular manufacturer and/or lens type from a list provided by the computer, for example, from a generated screen menu.

Table 38 is designed to move a lens about a small area (e.g., 6 in.×3 in.). Movement of the table along the two axes can be achieved by 2 conventional sets of identical hardware that are attached to the underside of the table in a perpendicular arrangement to each other. The particular mechanism for moving the stage is not critical. In a preferred embodiment, two recirculating ball bearing carriages mounted on hardened steel rails provide linear motion of the table. Specifically, the motion of the carriages are controlled by two stepper motors fitted with timing belt pulleys. A timing belt is tensioned between the motor pulley and a larger idler pulley opposite the motor. The belt is anchored to the underside of a moving plate with a double clamp with grooves to receive the teeth of the belt. The belt is cut and one end is clamped in one side of the double clamp anchor. The belt is wrapped around the pulleys with the motor in its most untensioned position and the other end is clamped in the opposite side of the double anchor clamp with small clamp bars. Final tension (2 to 5 lbs.) is achieved by positioning the motor in slotted motor attachment holes.

Photodetectors are employed to identify the "home" or end travel position on the surface of the table. For example, to designate the end position along the x-axis, a source of light is employed which directs a beam of light that is perpendicular to the x-axis and that passes through the end of the table in the x-y plane. The light is detected by a photodetector positioned on the opposite side of the rail which is parallel to the x-axis. The carriage which moves on this rail has a small aluminum shield which interrupts the light when the carriage is at the end of travel thereby causing the photodetector to generate a signal for the "home" position relative to the x-axis. A similar mechanism is employed for the y-axis.

The stepper motors contain multiple coils which can be energized in a defined pattern to move the rotor in either direction over a wide range of speeds. The computer records the state of coil activation and thereby the position of the rotor, timing belt and carriage. Switching the coil activation results in a discrete step hence the name "stepper motor". In this case, each step of the motor results in a movement of 0.075 mm (0.003 in.). This step size defines the resolution, accuracy and basic coordinate system unit of the machine.

A custom printed circuit board (PCB) can be designed and fabricated to control the reinker device. An external connector allows a typical personal computer to be linked to the PCB with a standard printer cable. An additional external connector connects a joystick to the system. The PCB contains circuitry to amplify weak signals from the personal computer to control the motors, lamp and solenoid. Additional circuitry conditions input signals to communicate with the personal computer.

In operation, after an ophthalmic lens 36 is placed on table 38 the lens is positioned under the microscope for inspection. A technician directs the computer to move the lens under the microscope so that a semi-visible mark search can be conducted. An input device is employed to interface with the computer and may comprise a keyboard, keypad, mouse, joystick or the like. Employing the microscope, the operator locates the positions of both semi-visible marks and inputs their positions (e.g., x and y coordinates) in the computer. Since the semi-visible marks are typically separated by a known standard distance, i.e., 34 mm, the computer can aid the operator in this task by moving the lens to the approximate location of the second mark, after the first has been located. Once the two semi-visible marks are found relative to the machine coordinate system, the computer can precisely determine the location and orientation of the lens. The pen is used to restore the ink marks precisely in their proper locations.

Let (x, y) represent stage rectangular coordinates aligned with the two movement directions on the stage. Let (u, v) represent lens rectangular coordinates where the lens' two logo marks define the u axis (v=0) and point (u=0, v=0) is centered between the two marks. Additionally, define lens polar coordinates given by $p=\text{sqrt}(u^2+v^2)$ and $\Phi=\tan^{-1}(v/u)$.

Upon placement of the lens on the stage, and translation of the lens under the microscope, the location of the logo marks may be identified for the computer. Let $(x_L, y_L)$ and $(x_R, y_R)$ represent the stage coordinates of left and right marks respectively. The center point between the two logo marks is then given by:

$$x_0 = x_L + (x_R - x_L)/2$$

$$y_0 = y_L + (y_R - y_L)/2$$

and the angle between the lens u axis and the stage x axis is given by:

$$\theta = \tan^{-1}\frac{(y_R - y_L)}{(x_R - x_L)}$$

The transformation of an arbitrary point in (u, v) lens coordinates to (x, y) stage coordinates is then given by:

$$x = x_0 + \rho\cos(\phi + \theta)$$

$$= x_0 + \sqrt{u^2 + y^2}\cos(\tan^{-1}v/u + \theta)$$

$$y = y_0 + \rho\sin(\phi + \theta)$$

An arbitrary arc centered about lens coordinates (u, v) with radius R subtending angles $\Phi_1$ and $\Phi_2$ transforms into stage coordinates as centered about (x, y) with R subtending angles $\Phi_1+\theta$ and $\Phi_2+\theta$.

Thus, after the transformation between lens and stage coordinates is established, any arbitrary manufacturer verification markings defined with respect to the two logo marks can be transformed into stage coordinates and reproduced on the lens. A program written in C++ was developed to implement the transformation. The program is set forth in the microfiche appendix.

The computer calculates the x-y movements needed to precisely apply the marks for that specific lens location and orientation. The lens is moved from the microscope to a position under the pen mechanism. By repeatedly lowering the pen onto the lens surface and moving the lens under the pen, the image (i.e., verification markings) is reconstructed.

Prior to inking a lens, the pen is calibrated to reconcile any error introduced by an abnormal pen or a variation in the mechanism. This can be achieved, for example, by forming an arbitrary point mark with the pen on the lens, aligning the point mark in the cross hairs, and inputting this information which allows the computer to correlate the position of the pen relative to the microscope cross hairs.

In the usual case, the technician will be restoring verification marks on progressive ophthalmic lenses from a particular manufacturer or from a particular model lens. If the same manufacturer makes more than one type of progressive ophthalmic lens, each bearing different verification marking patterns; the computer can be programmed to apply the appropriate marks using the coordinate transformation method described above. In this instance, the computer can be instructed to apply appropriate marks using the coordinate transformation methods described above. However, if the technician is working with many types of progressive ophthalmic lenses each with a particular verification marking pattern, the technician then has to identify the particular manufacturer or model and input this information into the computer which selects the proper verification marks to be applied from the computer database. In either event, the technician must identify the particular manufacturer and/or model of the ophthalmic progressive lens so that the computer can generate the proper verification marks. Therefore, when only one manufacturer and/or model progressive ophthalmic lens is involved, the computer database need only contain information regarding the verification marking pattern for that particular manufacturer and/or model.

In the preferred embodiment, the verification markings are applied on the surface of the ophthalmic lens by positioning the tip of the pen on the surface of the lens and thereafter moving the table on which the lens is placed. The pen is essentially stationary and moves only in the vertical direction. The movement of the table is computer assisted. However, it is understood that the present invention encompasses a device wherein the verification marks are applied by the computer controlled movement of the pen with the table being stationary or wherein both the pen and table move in a coordinated fashion.

The present invention is also employed to produce verification markings on molds that are used to cast progressive ophthalmic lenses. In this case, the mold will be placed on the table of the inventive device and the technician, with the aid of a microscope, will identify the two recesses in the mold surface which correspond to the reference marks on the lens. The same basic procedures can be employed to apply the verification marks on the mold surface.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of applying non-permanent verification markings on a progressive ophthalmic lens that does not have discernable demarcations between distance, near and intermediate viewing zones and that has reference marks on a lens surface which comprises the steps of:

providing a stage, wherein positions of the stage are identifiable in a coordinate system;

attaching the lens to the stage without orienting the reference marks relative to the stage;

locating two of said reference marks on the surface of the lens;

identifying the positions of the two reference marks by coordinates;

entering the coordinates of the two reference marks in a computer which includes a database containing the coordinates of the verification markings for the lens;

positioning the lens under a pen;

calibrating the pen's position; and applying the verification markings on the lens surface with the pen wherein the verification markings are produced by movement of the (i) stage, (ii) pen, or (iii) both the stage and pen and wherein said movement is controlled by the computer.

2. The method of claim 1 wherein the database contains the coordinates for more than one set of verification markings and the method includes the step of selecting a set of verification markings to be applied.

3. The method of claim 2 wherein the calibration step comprises the steps of:

creating a point mark on the lens surface;

determining the coordinates that correspond to the point mark's position and entering these coordinates in the computer; and correlating the position of the pen relative to the position of the point mark.

4. The method of claim 1 wherein the step of locating the two reference marks comprises locating the two marks with a microscope.

5. The method of claim 4 wherein the microscope comprises an eyepiece with a cross hair reticle.

6. The method of claim 1 wherein the verification markings comprise markings selected from the group consisting of a major reference point, axis line, lens fitting cross, distance power measuring circle, add power measuring circle, and mixtures thereof.

7. The method of claim 1 wherein the verification markings comprise ink mark patterns.

8. The method of claim 1 wherein the calibration step comprises the steps of:

creating a point mark on the lens surface;

determining the coordinates that correspond to the point mark's position and entering these coordinates in the computer; and correlating the position of the pen relative to the position of the point mark.

9. The method of claim 1 wherein the stage is movable within a plane and the step of applying the verification markings comprises moving the stage.

10. The method of claim 1 wherein said movement is guided by coordinate transformations determined by locating the reference marks.

11. A device for restoring non-permanent verification markings on a-progressive ophthalmic lens that does not have discernable demarcations between distance, near and intermediate viewing zones and that has reference marks on a lens surface which comprises:

a stage which defines a coordinate system and onto which the ophthalmic lens is placed without orienting the reference marks relative to the stage;

a magnifying device for locating the reference marks on the ophthalmic lens surface;

means for identifying the positions of the reference marks by their coordinates of the coordinate system;

a computer having a database containing the coordinates of verification markings for the progressive ophthalmic lens; and means for applying verification markings on the ophthalmic lens surface, said means including a pen that is positioned over the surface of the ophthalmic lens wherein movement of the (i) stage, (ii) pen, or (iii) both the stage and pen are controlled by the computer in producing the non-permanent verification markings on the ophthalmic lens surface.

12. The device of claim 11 wherein the database contains the coordinates for more than one set of verification markings.

13. A method of applying non-permanent verification markings on a mold that defines recesses on a surface of the mold wherein the mold is used for casting a progressive ophthalmic lens that does not have discernable demarcations between distance, near and intermediate viewing zones and that has reference marks on a lens surface which comprises the steps of:

providing a stage wherein positions of the stage are identifiable by a coordinate system;

placing the mold on the stage without orienting recesses relative to the stage;

locating two of said recesses on the surface of the mold which correspond to reference marks on the lens;

identifying positions of the two recesses by their coordinates;

entering the coordinates of the two recesses in a computer which includes a database containing the coordinates of the verification markings for the mold;

positioning the mold under a pen;

calibrating the pen; and applying the verification markings on the mold surface with the pen wherein the verification markings are produced by movement of the (i) stage, (ii) pen, or (iii) both the stage and the pen and wherein said movement is controlled by the computer.

14. The method of claim 13 wherein the database contains the coordinates for more than one set of verification markings and the method includes the step of selecting a set of verification markings to be applied.

15. The method of claim 14 wherein the calibration step comprises the steps of:

creating a point mark on the lens surface;

determining the coordinates that correspond to the point mark's position and entering these coordinates in the computer; and correlating the position of the pen relative to the position of the point mark.

16. The method of claim 13 wherein the step of locating the two recesses comprises locating the two recesses with a microscope with an eyepiece having cross hairs.

17. The method of claim 13 wherein the stage is movable within a plane and the step of applying the verification markings comprises moving the stage.

18. The method of claim 13 wherein the verification markings comprise markings selected from the group consisting of a major reference point, axis line, lens fitting cross, distance power measuring circle, add power measuring circle, and mixtures thereof.

19. The method of claim 13 wherein the verification markings comprise ink mark patterns.

20. The method of claim 13 wherein the calibration step comprises the steps of:

creating a point mark on the lens surface;

determining the coordinates that correspond to the point mark's position and entering these coordinates in the computer; and correlating the position of the pen relative to the position of the point mark.

21. The method of claim 13 wherein said movement is guided by coordinate transformations determined by locating the reference marks.

22. A device for producing non-permanent verification markings on a mold that defines recesses on a surface of the mold wherein the mold is used for casting a progressive ophthalmic lens which comprises:

a stage which defines a coordinate system and onto which the mold is placed without orienting the recesses relative to the stage;

a magnifying device for locating the recesses on the mold surface which correspond to reference marks on the lens;

means for identifying positions of the two recesses by their coordinates of the coordinate system;

a computer having a database containing coordinates of the verification markings for the progressive ophthalmic lens mold; and means for applying verification markings on the mold surface, said means including a pen that is positioned over the surface of a mold wherein movement of the (i) the stage, (ii) pen, or (iii) both the stage and pen are controlled by the computer in producing the non-permanent verifications markings on the mold surface.

23. The device of claim 22 wherein the database contains the coordinates for more than one set of verification markings.

* * * * *